(12) United States Patent
Urriola et al.

(10) Patent No.: US 7,056,058 B2
(45) Date of Patent: Jun. 6, 2006

(54) TRANSPORT CORRIDOR DRAINAGE SYSTEMS

(76) Inventors: Humberto Urriola, Suite 401, 781 Pacific Highway, Chatswood, NSW (AU) 2067; Christian Urriola, Suite 401, 781 Pacific Highway, Chatswood, NSW (AU) 2067

( * ) Notice: Subject to any disclaimer, the term of this patent is extended or adjusted under 35 U.S.C. 154(b) by 0 days.

(21) Appl. No.: 10/722,981

(22) Filed: Nov. 28, 2003

(65) Prior Publication Data

US 2005/0100401 A1    May 12, 2005

Related U.S. Application Data

(62) Division of application No. 09/914,333, filed on Aug. 24, 2001, now Pat. No. 6,779,946.

(30) Foreign Application Priority Data

Feb. 24, 1999    (AU) ........................ PP8843

(51) Int. Cl.
*E02B 11/00* (2006.01)
(52) U.S. Cl. ............... 405/43; 405/36; 404/2
(58) Field of Classification Search .......... 405/29, 405/36, 38, 39, 43, 45, 50, 51; 137/236.1; 210/170
See application file for complete search history.

(56) References Cited

U.S. PATENT DOCUMENTS

| | | | | | |
|---|---|---|---|---|---|
| 3,990,247 | A | * | 11/1976 | Palmer | 405/16 |
| 5,030,343 | A | * | 7/1991 | Urriola | 210/170 |
| 5,250,340 | A | * | 10/1993 | Bohnhoff | 428/99 |
| 5,447,389 | A | * | 9/1995 | Olson | 405/129.7 |
| 5,810,510 | A | * | 9/1998 | Urriola | 405/45 |
| 5,848,856 | A | * | 12/1998 | Bohnhoff | 405/36 |
| 6,095,720 | A | * | 8/2000 | Stark | 405/129.6 |
| 6,736,569 | B1 | * | 5/2004 | Lee | 405/50 |

* cited by examiner

*Primary Examiner*—Thomas B. Will
*Assistant Examiner*—Alexandra Pechhold

(57) ABSTRACT

A drainage structure having perforated parallel top and bottom plates (5 & 6) separated by spacer members (7). A web (15) joins adjacent spacer members (7) and has a curved profile (17) such that water spilling over the web (15) does so, at a varying velocity profile to increase oxygenation of the water. This drainage structure (1) can also be filled with good drainage soil (42) and planted with grass (4) to filter and retain water that passes therethrough, with a layer of filter medium (42) below and a water permeable drain (1 & 24) below the filter medium (42), to transport water into the substrate and into a reticulation tank (57) where the water can percolate back into the soil.

8 Claims, 19 Drawing Sheets

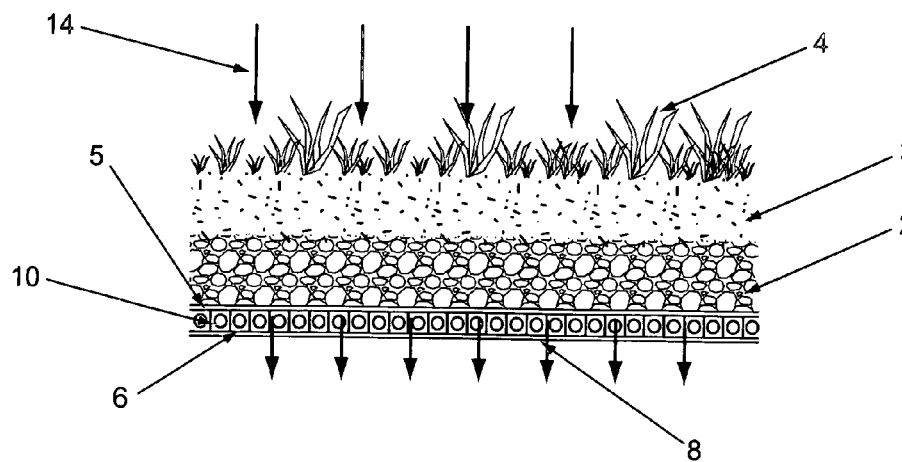
Fig. 1
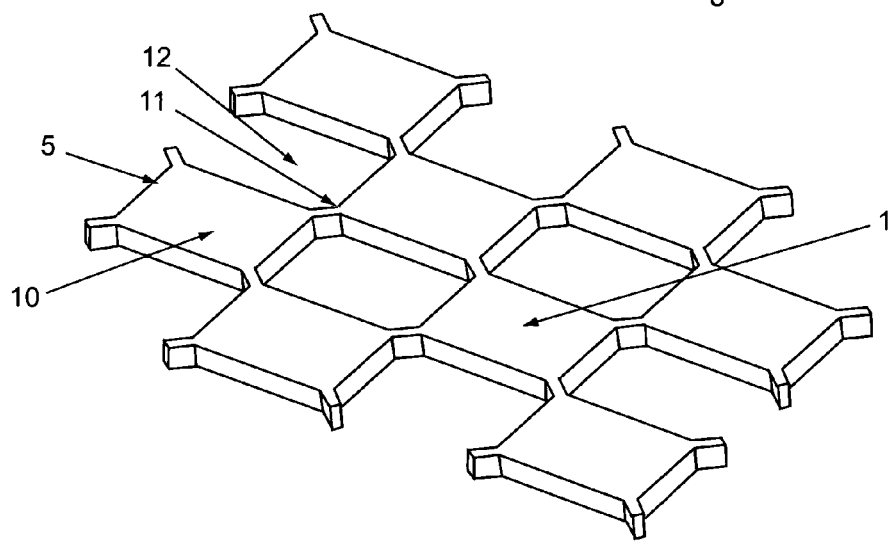
Fig. 2
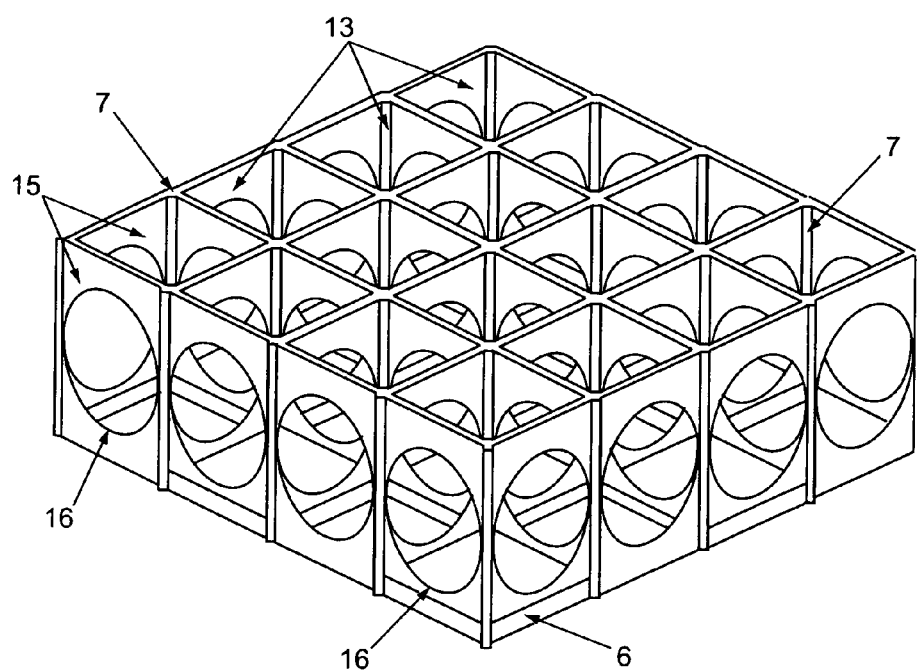

High Traffic Area

Medium Traffic Area

Low Traffic Area

TRANSPORT CORRIDOR DRAINAGE SYSTEMS

The present application is a divisional application from U.S. patent Ser. No. 09/914,333, lodged Aug. 24, 2001 now U.S. Pat. No. 6,779,946.

The present invention relates to the provision of structures for the adequate drainage of liquids by artificial means and has particular application in the area of landscape gardening and/or the provisions of grass standings or verges. Further embodiments of the invention relates to an improved drainage system for traffic areas such as roadways, train corridors and runways.

Known methods of draining water from relatively large surface areas where the funnelling of water directly into narrow diameter pipes is impractical or impossible, involve the use of a layer of stone or gravel capable of supporting the surface to he drained. Water from this "gravel" layer may then be allowed to percolate into the ground below, follow the lie of the land through said gravel to further conventional drainage channels or pipes or is otherwise evacuated.

Where the area to be drained is a roof-top garden for example, and the roof top is of concrete, the concrete may be covered with a water impervious membrane; the membrane serving to shed water into conventional channels, gutters or drains. Over the membrane there may he a layer of pebbles that is in turn covered by drainage structure in the form of a generally flat filter of a material known as geotextile material. Finally, a layer of soil is laid in which vegetation may be grown is applied over the filter.

The layer of pebbles facilitates drainage of water from the soil to enable adequate oxygen to reach the roots of vegetation therein, and the filter prevents the soil from clogging the layer of pebbles, which would prevent drainage. The lower impervious membrane prevents the ingress of moisture to the building or structure below.

The above described use of pebbles, or gravel or stone in place of the pebbles, bas been found to have various defects. Firstly, such a system may be expensive insofar as stones or pebbles, which are heavy, present transportation problems both in terms of moving them to the site and to lifting them when at the site. Also, the supporting structure may need reinforcing to support the pebbles or the stones. The pebbles may puncture the impervious membrane due to sharp edges and/or excessive weight. The abovedescribed system does not permit the deployment of water or power or other conduits within the system, particularly where such conduits are to be put in after the drainage system has been laid.

In European Patent No. 0244651 it set forth a drainage structure that addresses these problems, and overcomes them by providing that a drainage structure is of generally flat configuration and is cellular in nature, so that water (or other liquid or gas) can pass through it in any direction which means either in a direction transverse to the plane of the structure or in a direction in the plane of the structure.

The structure disclosed in said European Patent comprises a pair of plate members having apertures therein, held in spaced relation by means of spacer members so that there are formed cells, which are hydraulically interconnected with each other, between the plate members. When the structure is in use, it will normally be horizontal or substantially so, and to induce the water flowing through the structure to pass between the cells, the apertures of the top plate member are offset relative to the apertures of the bottom plate member.

As, also shown in the European Patent, at the lower ends of the spacer members, are connecting walls that extend between adjacent spacer members. These walls retain some water in the bases of some of the cells to a level to the tops of the walls, and in use the water eventually cascades over the walls into adjacent cells where there are apertures in the lower plate member, and the water then flows out of the apertures and out of the structure. In so cascading, the water makes some splashing, which in turn adds to the oxygenation of same, improving the quality of the draining water.

The present invention, in one form, is concerned with this aspect of the prior draining structure, and seeks to improve this oxygenation Of the draining water even further and to thereby improve its quality, although it is not necessary that the draining structure of the present invention have all of the specified features of the prior structure, even although they are preferred.

According in one form, the present invention comprises a draining structure which is generally flat in nature and is for use mainly in a horizontal or substantially horizontal disposition, and comprises top and bottom plate members which are held spaced apart by spacer members so that the structure is cellular in nature with the cells hydraulically interconnected with each other, the plate members having apertures therein which are disposed so that the apertures in the top plate member are offset relative to the apertures in the bottom plate member, and wherein there are web walls extending between adjacent spacer members at the lower plate member and form at their top edges, weirs for water which is retained by the web walls, wherein the top edges of the web walls are curved, notched or otherwise shaped or the walls have apertures, to cause the water spilling over these edges into adjacent cells at a varying velocity profile to increase the oxygenation of the water as it splashes on falling from the weir top edges.

Preferably, the web walls are provided adjacent the top and bottom plates, so that the structure is usable equally well either way up, i.e., with either plate upmost. The said edges are preferably curved edges and may be defined by circular, oval or other continuously curving shapes formed in which are webs connecting adjacent spacer members.

This form of the invention provides for better oxygenation of the water passing through the structure whereby its quality can be improved, simplifying disposal into the municipal draining system, and there is the added advantage that the web walls can be such as to provide better resistance of the structure it shear forces applied in the plane of the structure and compression forces applied transverse to the plane of the structure. Shearing can happen in use by virtue of ground movements, especially where the structure is use on sloping ground, and compression loading can occur where the structure is used in circumstances where live loads such as vehicle traffic can be expected.

As in the prior structure, the structure is preferably a one piece moulding of plastics material, although for larger areas, several of the structures can be clipped together by virtue of formations on the structures themselves, or by other means.

It is to he mentioned that the invention is not limited in its use to roof-top gardens. It can be used to provide drainage under roadways, under embankments and elsewhere where drainage is required and/or where surface erosion might be a problem. For instance in car parks or pervious roads to mitigate flood or contaminated waters from roads or highways, the structure can be used as a pervious paving combination with pervious soils and/or plants such as turf. The structure can be designed to allow heavy loads to he impressed thereon without damaging the plant material.

According another form, the present invention comprises a liquid pervious layer support which is generally flat in nature and is for use mainly in a horizontal or substantially horizontal disposition, and comprises top and bottom plate members which are held spaced apart by spacer members so that the structure is cellular in nature with the cells in communication with each other, the plate members having support areas alternating with apertures in a checkerboard arrangement, the apertures are disposed therein so that the apertures in the top plate member are offset relative to the apertures in the bottom plate member, each support area having an opening therein and wherein there are web walls extending between adjacent spacer members at the lower plate member and form at their top edges, weirs for water which is retained by the web walls, wherein the top edges of the web walls are curved, notched or otherwise shaped or the walls have apertures, to cause the water spilling over these edges into adjacent cells at a varying velocity profile to increase the oxygenation of the water as it splashes on falling from the weir top edges.

Preferably the web walls are formed on both the top and bottom plate members.

Other pervious paving on the market has been unsuccessful because of the small capacity of the pervious drainage element and the heat absorbed by the concrete that burns or dehydrates the grass. Other plastic paving does not allow the natural horizontal and vertical growth of the root system of turf. In the case of this structure it allows the natural horizontal growth of the turf root systems, protecting other materials in the system, such as the lining material, from compaction due to the road traffic.

The system will, preferably, require a drainage structure beneath the root zone at a depth of approximately 300 mm to ensure sufficient moisture capacity to allow the robust growth and recovery of the turf.

The invention also extends to a drainage system embodying a structure as aforesaid and a method of drainage using a drainage structure as aforesaid.

Presently the roadways are based upon the old Roman system of having a water impervious top layer that directs water into side gutters where it passes into underground pipes and drains, which are impervious to water, and is directed from a large catchment area into creeks, rivers and the ocean.

Thus when it rains, all of the rubbish and pollution such as oil, grease, vegetation, dog faeces, food stuffs, paper and detergents, are flushed into the drainage system and concentrated into the outfall area, such as a creek, river and the ocean. There is little or no attempt in most of the existing drainage systems to decontaminate this pollution. If any treatment is carried out, it, usually, only involves a filtering out of larger solids. This dumping of the stormwater runoff into the water ways, depletes the oxygen from the waterways, and introduces chemicals which increases, in some cases exponentially, the growth algae, both of which destroys the healthy fauna and flora of the waterways.

Further because the natural water absorbing soils and vegetation have been covered or removed and replaced by water impermeable roads, there is an increase in the amount of runoff in urban areas, than if the area was in its natural state.

Additionally the use of bitumen and concrete on the roads causes a heat sink to absorb and retain the solar energy and in a small way contribute to the heating of the planet.

The present invention, in another form, seeks to ameliorate these problems by providing a roadway or other transport corridor drainage system comprising:

at least the edge surface, of the roadway or other transport corridor, being permeable to water, such that water can flow therethrough;

a permeable drain located at least below said permeable edge surface; and a water permeable retention tank connected to said permeable drain, such that runoff passes through the permeable surface into the permeable drain and into the permeable retention tank, where the water is stored and flows back into the soil through the walls of the tank.

The invention will now he described by way of example with reference to the accompanying drawings, in which:

FIG. 1 is a schematic sectional view of a system using a drainage structure according to one embodiment of the present invention;

FIG. 2 is an exploded perspective view of the drainage structure shown in FIG. 1;

Figure 3:
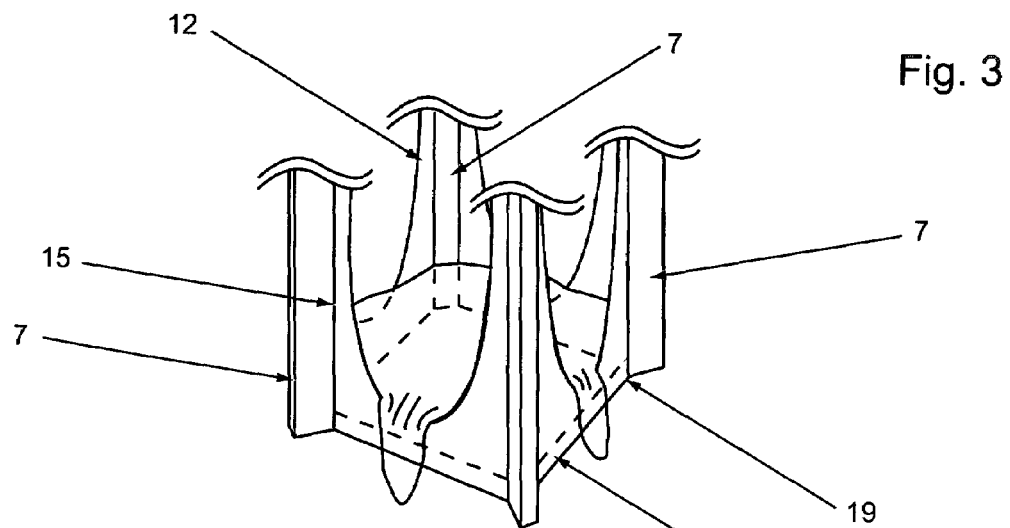
FIG. 3 is a perspective view, to an enlarged scale, of the lower part of a cell of the structure of FIG. 1.

A first embodiment of the present invention, as shown in FIG. 1, comprises basically the drainage cell structure (1) on which is superimposed a layer (2) which may be of pebbles or stones or the like, and a layer of soil (3) on which plants or grass (4) may be grown.

As can he seen from FIG. 1, structure (1) is a generally flat or planar structure, and comprises an upper plate member (5), and a lower plate member (6). These plate members are in fact of identical construction of which the detail is shown in FIG. 2, and they are connected and held spaced apart by spacer members (7) which can be of any cross section, but in this embodiment are in the form of square sectioned rods. As indicated herein however and as explained hereinafter, these plate members and the spacer members could be of different design. FIG. 1 shows that the drainage structure will receive water, for example rain water as indicated by arrows (14), and that water percolates through the layers (3) and (2) and into the drainage structure (1) through which it can flow transversely and laterally between the. spacer members (7), so that it eventually emerges into the supporting strata (9) as indicated by arrows (8).

Referring now in more detail to FIG. 2, each plate structure (5 & 6) is made up of square support areas (10) interconnected at corner regions (11) so as to form a checker board pattern as shown in FIG. 2. The support areas (10) are alternated with apertures 12 through which the water can flow.

The plate members (5 & 6) are arranged so that the apertures (12) in the top plate member (5) register with the support areas (10) in the lower plate member (6). Thereby, water flowing through apertures (10) must travel between the spacer members (7) that connect between the plate members (5 & 6) at the junctions (11), before the water can exit the lower plate member (6).

By virtue of this construction, the drainage cell (1) can be moulded in one piece in plastics material, and the construction is such that a plurality of cells (13) are defined between the plate members (5 & 6) and the spacer members (7). The spacer members (7) are angled to lie at 45° to the linear sides of the cells (13), to facilitate moulding.

Additionally, the drainage cells (13) are moulded with web walls (15) in both directions and between adjacent spacer members (7) with which the walls are integrally formed, and each wall (15) is provided with an oval aperture (16) to allow for fluid communication between the cells (13).

Figure 4:
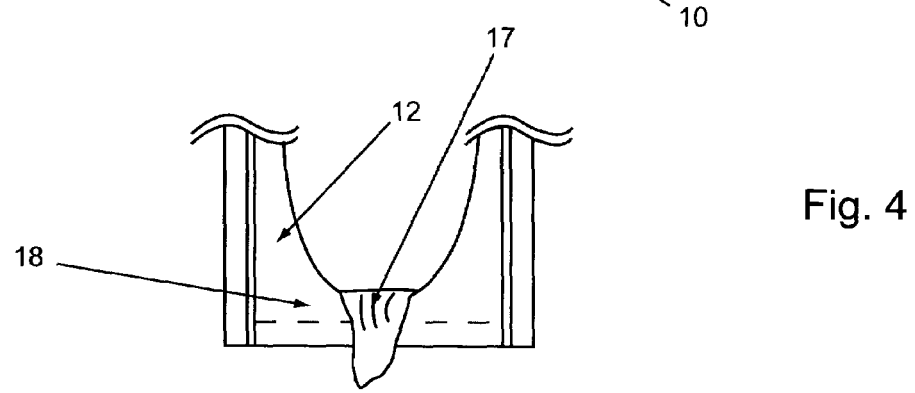
FIGS. 4 and 5 are respectively a side and sectional plan of the cell shown in FIG. 3, the section of FIG. 5 being taken on the line V—V of FIG. 2.

The apertures (16) do not extend to the surfaces of the support areas (10) in the plate members (5 & 6) so that they define flow weirs as will he explained in more detail in relation to FIGS. 3 and 4.

Referring now to FIGS. 3 & 4, a single cell bottom end is shown in FIG. 3, and of this cell, the base is defined by the inner surface of the support area (10) of the lower plate member (6). Above this support area (10) in the upper plate member (5) will be registered an aperture (12) and therefore water falling through that aperture will fall onto the inner surface of the support area (10) shown in FIG. 3 and will collect thereon until the level of water reaches the weir edge (17) of the aperture (12). This situation applies between each pair of spacer members (7) defining the cell.

In consequence, as the water level builds up, so the water will start to cascade over the curved weir edge (17) and onto the supporting strata (9). By using a curved edge (17), the velocity profile of the water cascading over the edge (17) will be varied so that some of the water will be travelling faster than other parts. It will be travelling fastest in the region (18). By so providing a varied velocity profile for the spilling water, when it cascades and splashes onto the underlying support strata (9) as shown at (19) in FIG. 3, better oxygenation of the water will take place and its quality will be enhanced.

Additionally, the webs (15) form shear and compression strengthening means for the entire drainage cell (1) which will make it more resistant to shear loading in the plane of the drainage cell (1) and compression loading in the transverse direction.

Figure 5:
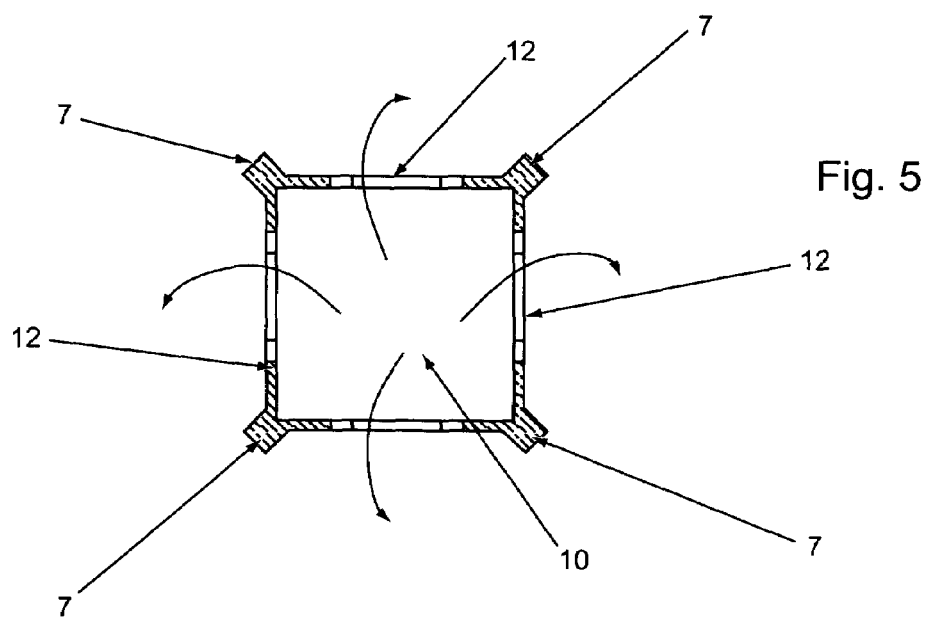

FIG. 5 shows how the water flows over the weir edges in all directions from the cell (13).

Figure 6:
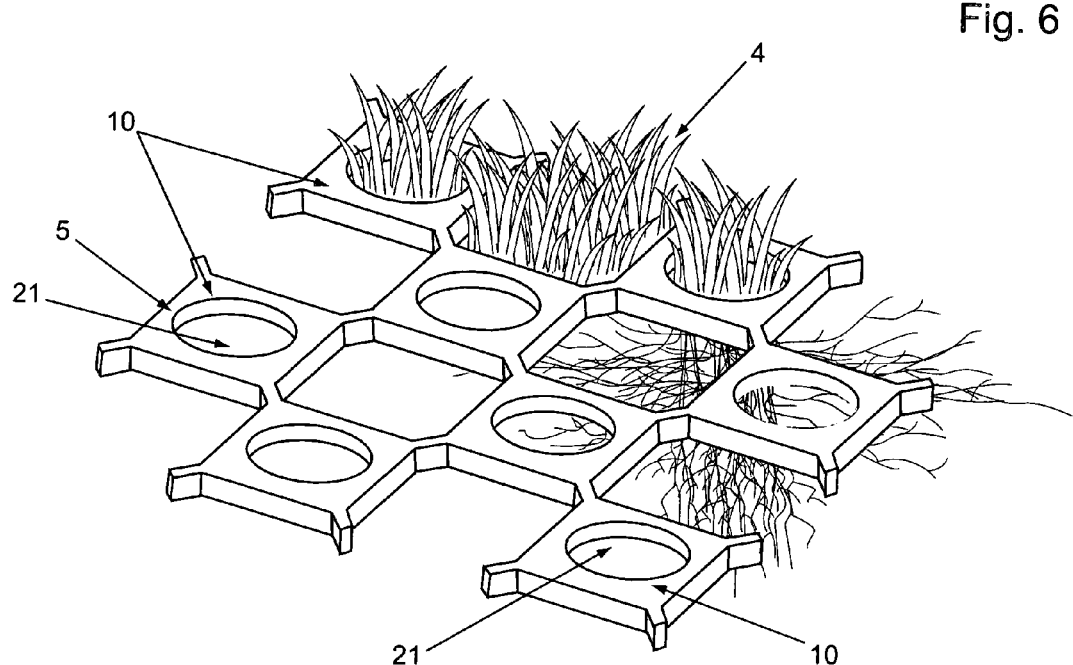
FIG. 6 is a view similar to that of FIG. 2 and shows an embodiment for providing both drainage and grass support.
Figure 7:
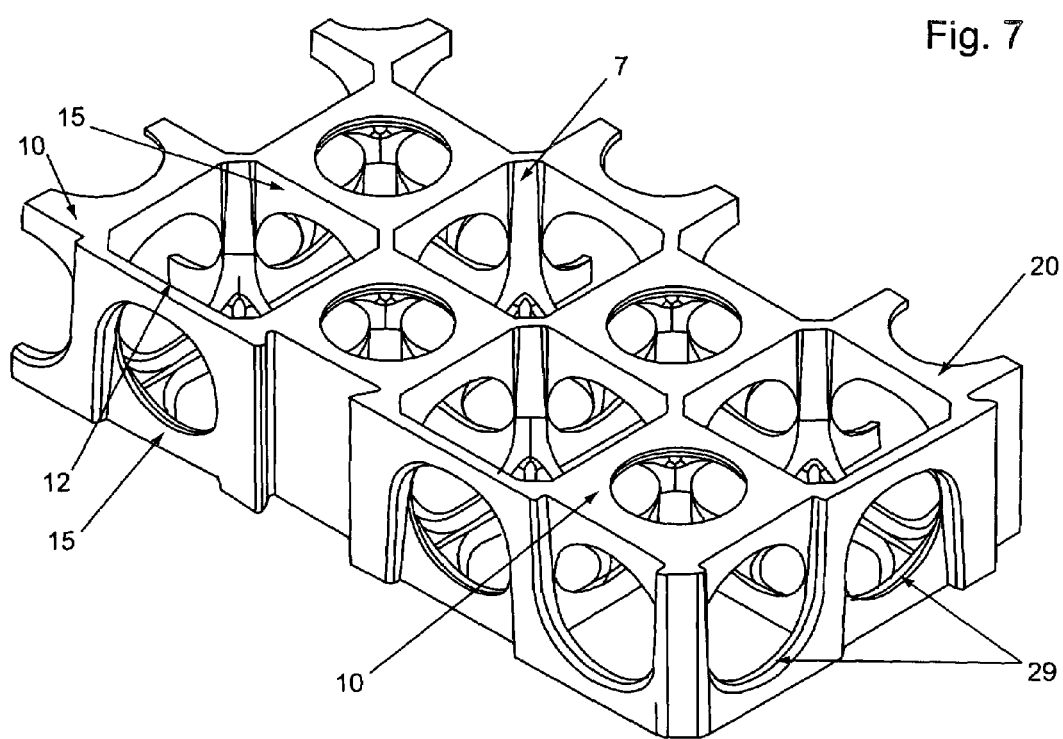
FIG. 7 shows a further embodiment of water pervious support structure.
Figure 8:
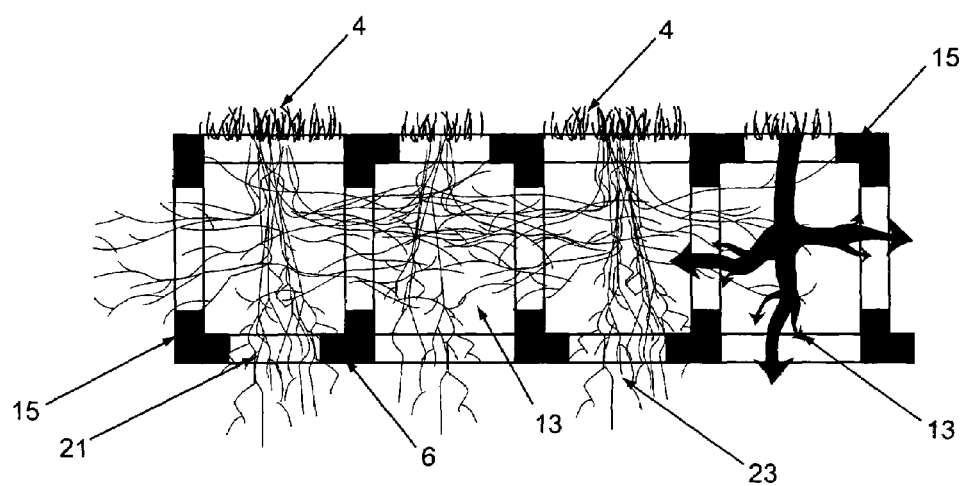
FIG. 8 is a schematic sectional view showing draining structure of FIG. 7 with the grass roots growth.

A further embodiment in the form of a pervious layer support (20) is shown in FIGS. 6, 7 & 8, wherein the pervious layer support (20) can be filled with aggregate or the like and preferably fixed therein, such that water can flow through the voids between the aggregates.

Further the pervious layer support (20) can be filled with growing medium, such that grass and other plants can he grown therein and become a "grass cell. This provides a considerable advantage, as the "grass cell" (20) can be used as a grass standing or verge, upon which motor vehicles can stand or run, as the "grass cell" (20) is also a load bearing member. According to this aspect of the invention, the structure need not be exactly according to the invention set forth above, but could be according to the drainage cell, the subject of the previously mentioned European Patent.

One of the embodiments of the grass cell is shown in FIG. 6, in which the "grass cell" (20) has a structure similar to that shown in FIG. 1, except that there are, in addition, openings (21) in the support areas (10) of the upper plate member (5), to provide for the growing of grass (4), which has its root structures (23) in the cells (13), which are filled with growing medium such as goods drainage soil or sand (22). The roots (23) will grow between cells (13), horizontally, through the apertures (16) and the grass will sprout up through the apertures (12) and the openings (21) in the upper plate member (5). The lower plate member (6) can also be provided with the openings (21), similar to the upper plate member (5).

FIGS. 7 and 8 show a "grass cell" (20) that is almost identical to the structure of FIG. 6, except that the spacer members (7) and the web walls (15) are of the same thickness and form transverse support plates. The structure has the apertures (12) and openings (21) in the upper and lower plate members (5 & 6) as discussed above, and FIG. 8 shows the grass cell in use.

Figure 11:
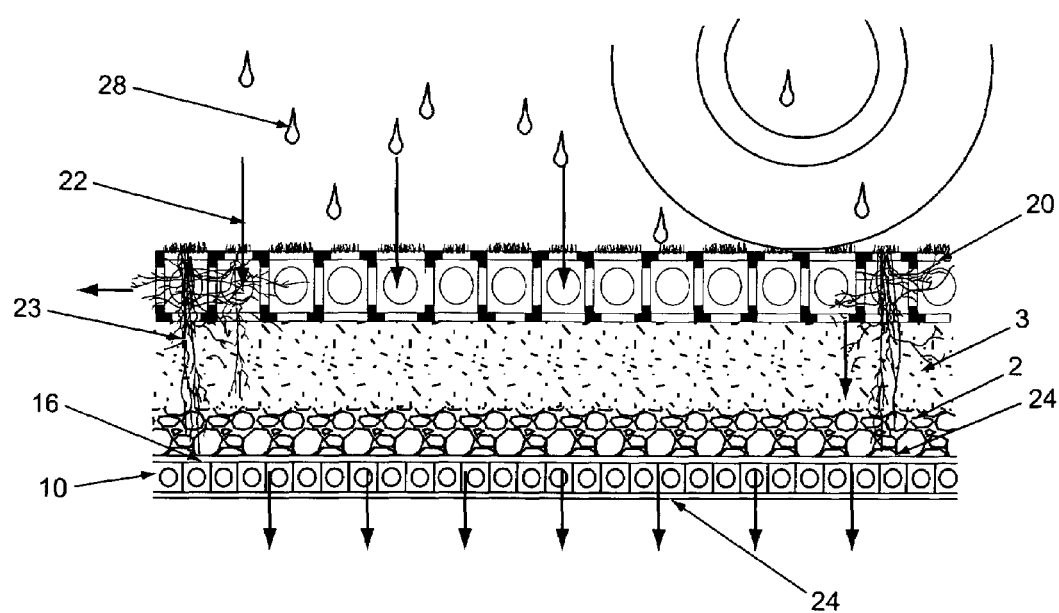
FIG. 11 is a view similar to FIG. 1 and shows a further embodiment of a draining system of the present invention.

FIG. 11 shows an arrangement similar to FIG. 1, wherein there is utilised a "grass cell" (20) as shown in FIG. 6 or 7 & 8, for the growing of grass (4), and a lower drainage cell (1) of the type shown in FIG. 1. Both structures can be of the same type, either as shown in FIG. 1 or FIG. 6 or FIG. 7 & 8.

As explained, the "grass cell" (20) provides for the growing of grass, whilst the lower drainage cell (1) is provided for drainage. The same reference numerals have been used to indicate parts already described. The "grass cell" (20), filled with sand or soil of good drainage properties (22) and the grass roots (23), seats on the soil layer (3) which sits on the aggregate layer (2). A goetextile filter material (24) covers the top and bottom of the drainage cell (1).

Figure 9:
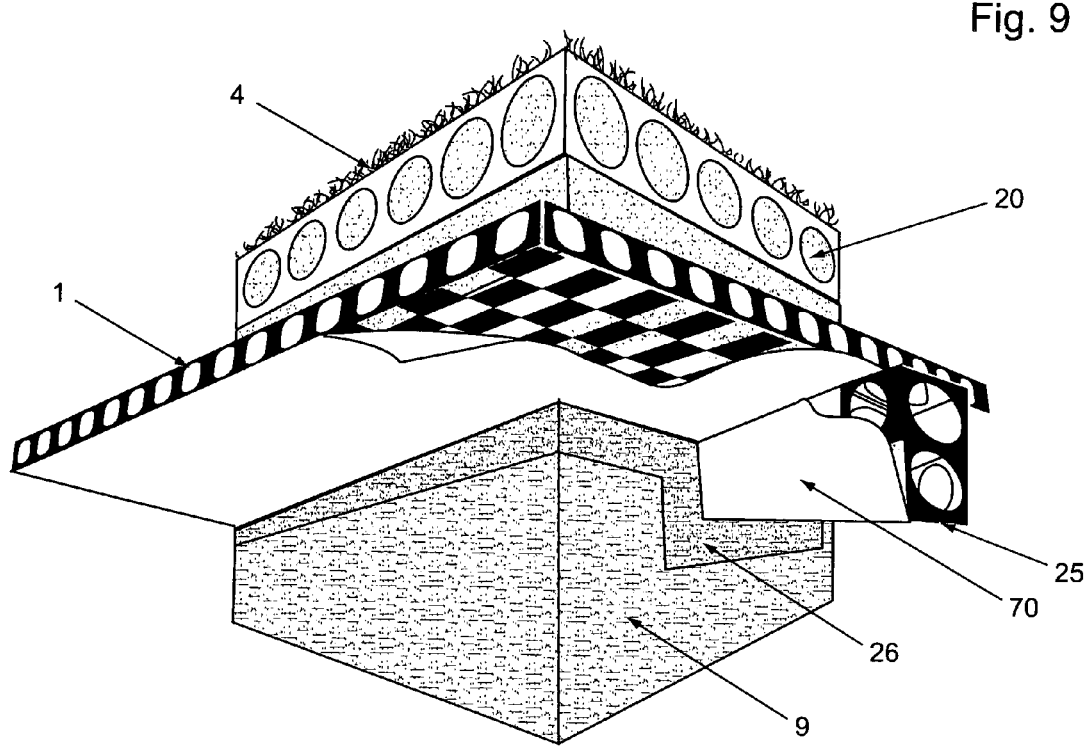
FIG. 9 illustrates schematically another embodiment of a drainage system according to the present invention.
Figure 10:
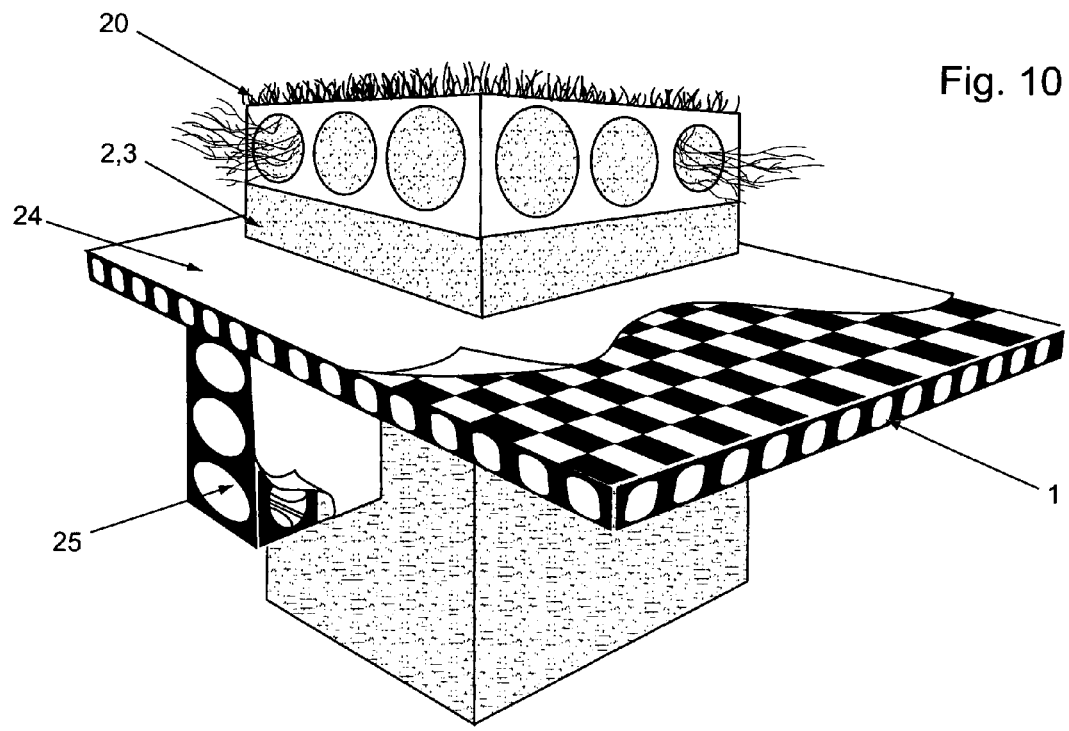
FIG. 10 illustrates schematically yet another embodiment of a drainage system according to the present invention.

As shown in FIGS. 9 & 10, the drainage cell (1) is in communication with a drain channel (25), which is separated from the surrounding sand layer (26), by means of wrapping (27) of a geotextile, and which is for carrying away water which has been filtered through the above described system. The sand (26) is supported by the supporting strata (9).

In the use of the arrangement shown in FIGS. 9, 10 and 11, rain or other water falling on the grass as indicated by the arrows (28) drains through the "grass cell" (20), and through the layers (3 & 2), and eventually into the drainage cell (1), where the water is aerated as described herein. Eventually, the water flows into the channel (25) and away to a collection tank, which may be a municipal tank, or could be a local household tank, where the system is installed in a domestic dwelling.

The invention provides, in one aspect thereof, in a simple and effective manner, for the better oxygenation of water passing through the drainage cell (1) which is of considerable importance or environmental reasons.

In the second aspect, the invention provides a structure use wherein growing medium fills the structure and plant roots grow therein, which roots can grow along the plane of the structure as well as through the structure. Providing such an arrangement means that the roots will be well aerated, which means that water passing the root system will be well aerated. In this second aspect, the structure. need not he the same as in the first aspect, although it is advantageously so.

The added strength of the cell will make it more suitable for use in locations where the ground is sloping, or is known to be subject to ground movement, and the carrying of loads.

As indicated, the grass cells and drainage cells are suitable for use in roof-gardens.

It is preferred that the structures be moulded in one piece in plastics material, hut again this is not an essential requirement of the invention.

The spacer members maintain the plate members in generally parallel relationship, but again this is not completely essential.

Also as specified in the European parent, the drainage cell defined according to the invention has the advantage that small pools of water will collect in the lower portions of the cells below the weir edges, and this can be useful in circumstances where no water flow occurs for a prolonged period of time. The collected water can evaporate and feed the growing material located above the drainage cell. Additionally, by virtue of the construction of the structure, the maintenance of oxygen adjacent the roots of any plants above the upper plate member is maintained, and by virtue of the cellular structure free flow of water and oxygen in any horizontal direction within the drainage cell can be maintained. Additionally, service pipes for liquid and power can be inserted into the structure after it has been placed in position.

The structure can be fabricated in any suitable plastics material, but polypropylene has been found to he particularly suitable. The structure is relatively rigid and shear resistant whilst being of relatively lightweight. The structure may be of the specific dimensions mentioned in said European patent.

The structure can be used in conjunction with a filter membrane as described or in any suitable manner.

The edges of the drainage cells or the "grass cells" may be provided with tongues and groove, or with a groove (29) into which a mating pin fits to enable them to be connected with similar structures to provide a large area of coverage.

In another form the present invention relates to an improved drainage system for traffic areas such as roadways, train corridors and runways.

Figure 12:
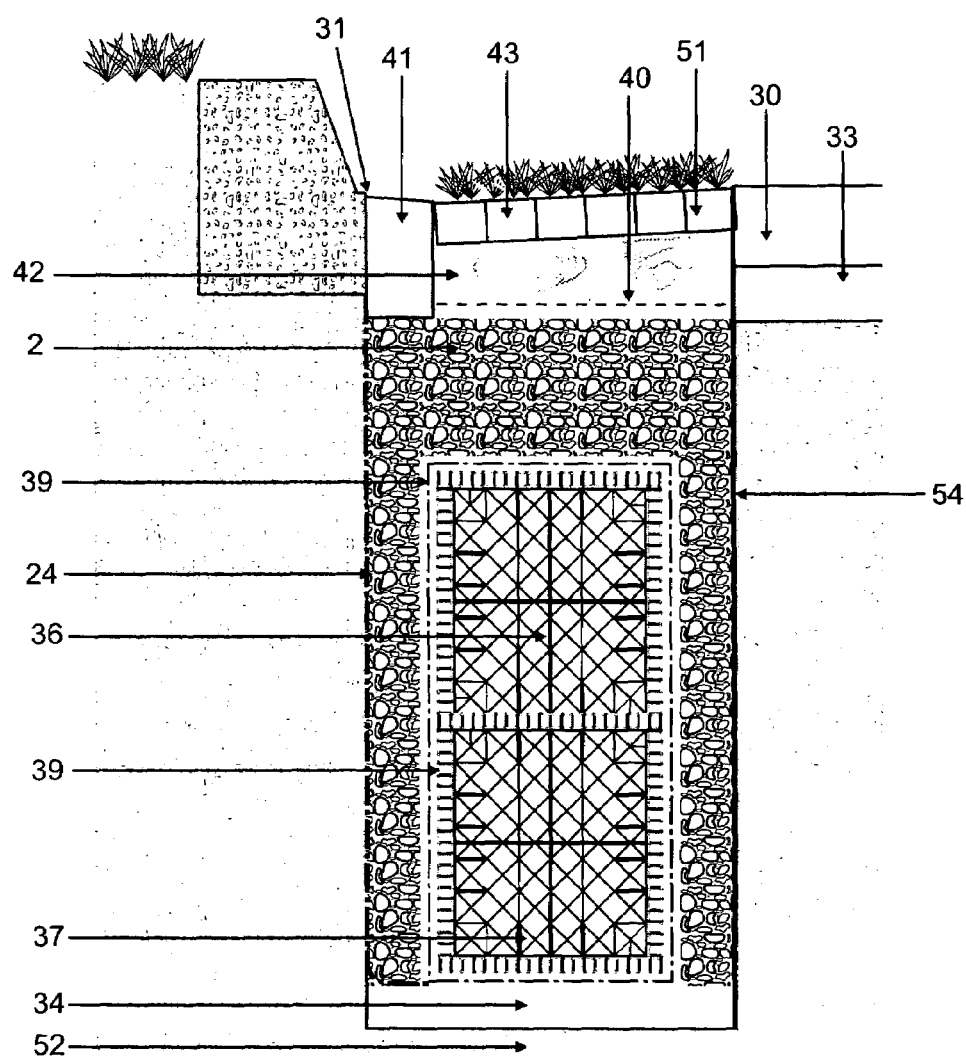
FIG. 12 illustrates a schematic cross-sectional view of a curb side roadway drainage system according to one embodiment of the present invention, utilizing modification of the existing gutter, but retention of the existing road surface.

An existing prior art roadway drainage system incorporates a water impervious road surface that is sloped to direct water into a gutter, where the water is directed along to flow into an underground water impervious drainage system where the water is discharged into a creek, river or the ocean. As shown in FIG. 12, one embodiment of the present invention involves the modification of the existing road (30) and gutter (31).

In this embodiment the lower gutter (32), road surface (32), and underlying sub-base (33), adjacent the gutter, are removed by any suitable means and is replaced by an infiltration area. A trench (34) is dug and a water impervious liner (35) is positioned against the roadway side of the trench (34), with a water permeable geotextile (24) on the curbside of the trench (34). The impervious liner (35) could be replaced with a water permeable geotextile similar to that on the other side of the trench. Placed at the bottom of the trench (34) are drainage modules (36). Generally these drainage modules (36) are hollow with perforated walls made from plastics, and are load bearing. The modules could be constructed as shown in Australian patent application no.593085, or could be constructed as shown in Australian patent application no. PQ3490, wherein the modules (36) have walls (37) composed of a lattice of thin web members (38). The modules (36) are placed, on a geotextile sheet (39), end to end along the trench, and also stacked one on top of the other to the required height, and wrapped in the geotextile sheet (39).

Suitable aggregate material such as gravel (2) surrounds the thus wrapped drainage modules (36), and a geogrid (40) that is permeable to water, is laid on top of the gravel (2). A suitable concrete edge (41) is placed against the cut existing gutter (31) and a layer of filter soil (42) is placed on top of the geogrid (40), with a honey combed supporting "grass blocks" (43) resting on the filter soil, and filled with soil and having grass (44) growing therein.

Figure 28:
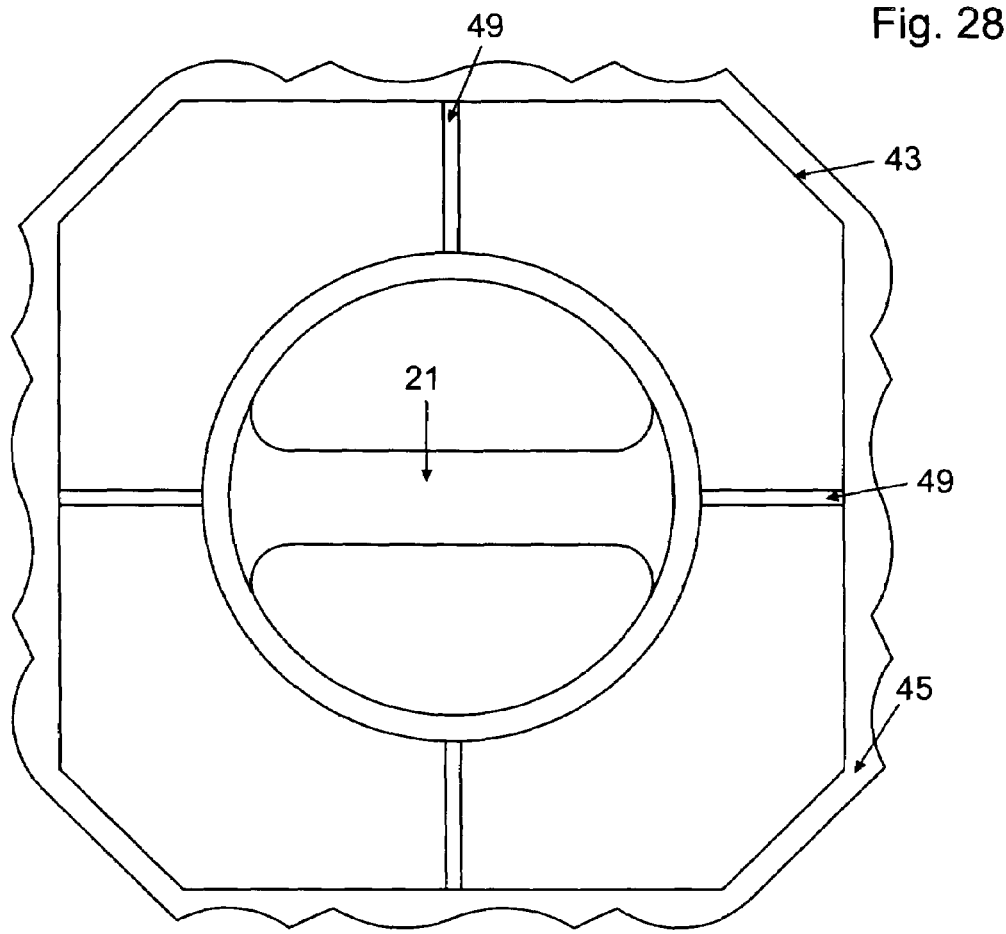
FIG. 28 illustrates a "grass block" suitable for use with the present invention.
Figure 29:
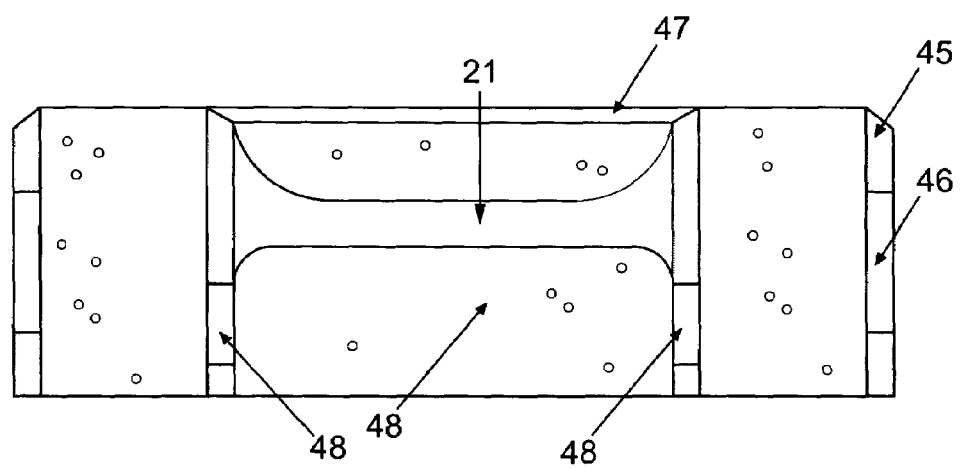
FIG. 29 illustrates a cross sectional view through the "grass block" shown in FIG. 28.

These blocks could be of any suitable dimensions and could be made of individual blocks as shown in FIGS. 28 & 29, wherein the blocks are made from concrete or plastics, and are open at each end. The "grass blocks" (43) have an octagonal outer wall (45), having openings (46) therethrough. An inner wall (47), having openings (48) therethrough, is connected by webs (49), to the outer wall (45). Preferably a strengthening web (50) extends across the central opening. These "grass blocks" are laid in a checkerboard fashion, as shown in figure (30) with smaller blocks interspersed to cover the area.

Figure 30:
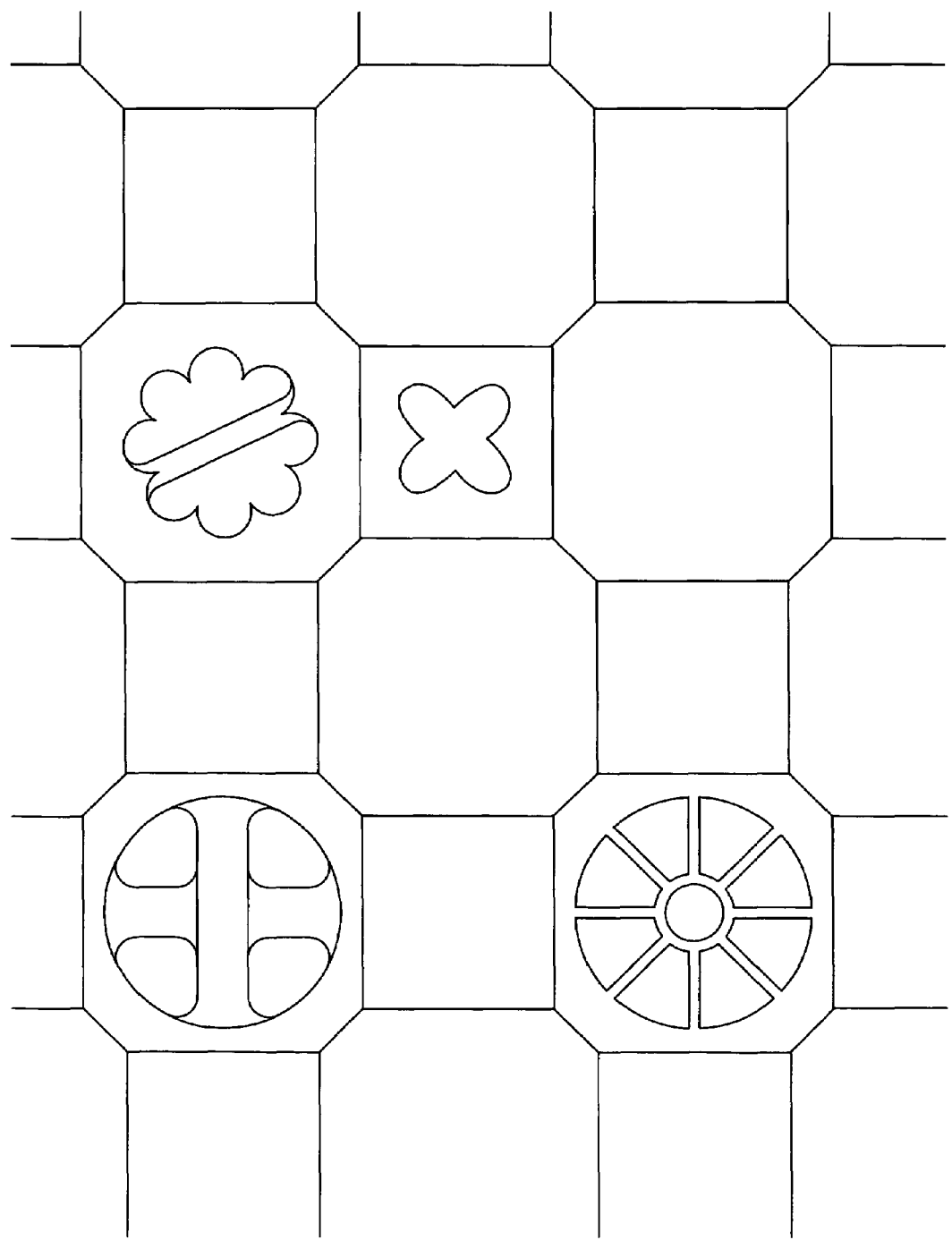
FIG. 30 illustrates schematically, the pattern of "grass blocks" on an area to be drained.

As shown in FIG. 30, the "grass blocks" (43) could also have thick walls and with only a central opening of any configuration.

Further instead of the "grass blocks" (43), "grass cells" (20), as shown in FIGS. 6, 7 & 8, could be used.

Both "grass cells" (20) and "grass blocks" (43) are strong enough to support the weight of vehicles and pedestrians, and because of their construction prevents compaction of the soil both within the "grass cells" (20) and "grass blocks" (43) and below them. Thus allowing for the runoff to quickly percolate through the "grass cells" (20) and "grass blocks" (43).

Therefore during rain, water runs off the impervious road surface (30) and onto the "grass cells" (20) or "grass blocks" (43) of the infiltration area, where the water percolates through the soil (51), into the filter soil (42), which can be a mixture of sand and soil, where some pollutants are absorbed and broken down by bacteria. The water then percolates through the aggregate material (2) and can pass into the surrounding soil (52), or flow into the water permeable channels formed by the drainage modules (36), where the water can be temporarily stored for percolation back into the surrounding soil (52), an/or can flow along the water permeable channels to a storage area for percolation back into the soil or for supplying water for sprinkler systems or the like.

Figure 13:
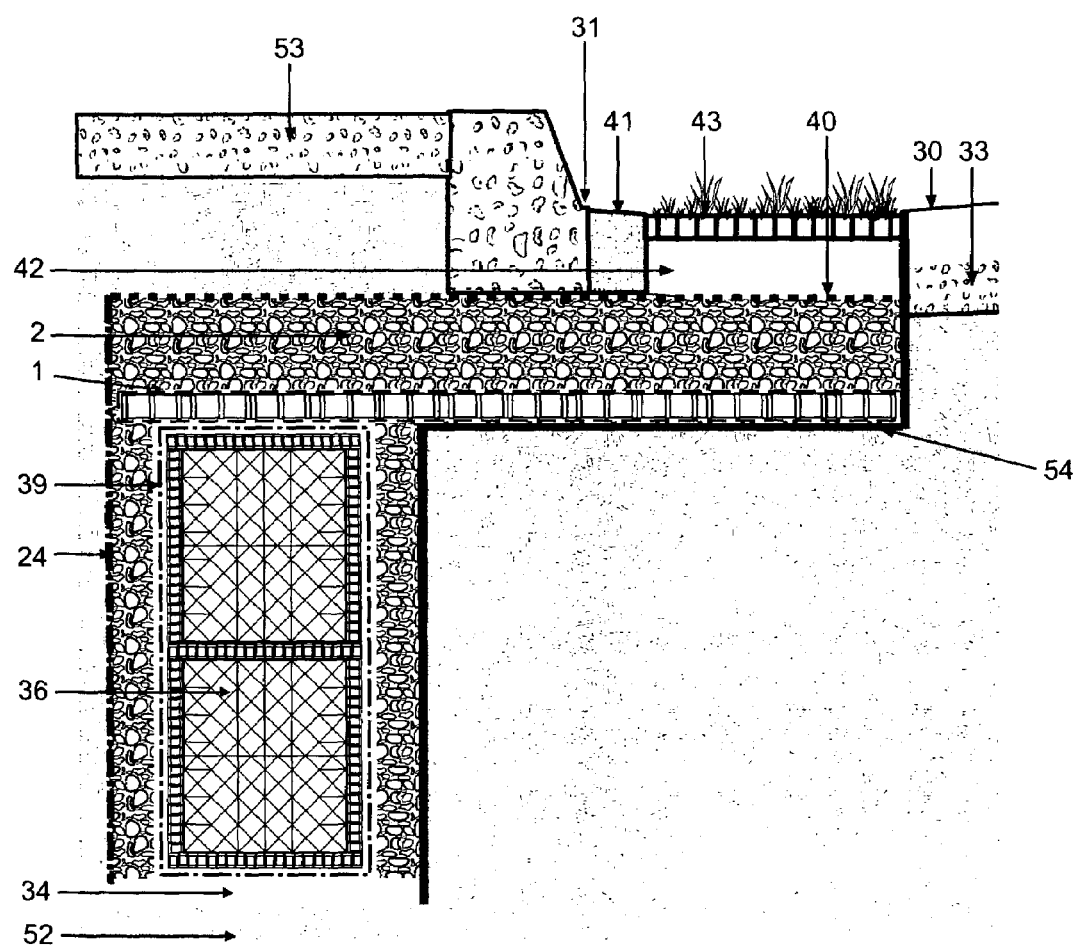
FIG. 13 illustrates a schematic cross-sectional view of a curb side road drainage system, according to another embodiment of the present invention, utilizing modification of the existing gutter, but retention of the existing road surface.

A further embodiment is shown in FIG. 13, in which the gutter (31) and the water impermeable road surface (30) of an existing road, is cut and removed in a similar to that described with reference to FIG. 12, except that in this case, the channel formed by the drainage modules (36) is placed under the pedestrian way (53). A drainage cell (1), wrapped in water permeable geotextile, is placed on the bottom of the trench (54) and extends onto the top of the drainage modules (36). An aggregate material (2) covers the drainage cell (1). Hence, water percolating through the grass blocks (43) or grass cells (20) flows through the aggregate material (2) and into the drainage cell (1) where it flows along to egress into the geotextile wrapped drainage modules (36). The distribution of the water back into the environment is the same as that of the previous embodiment.

Figure 14:
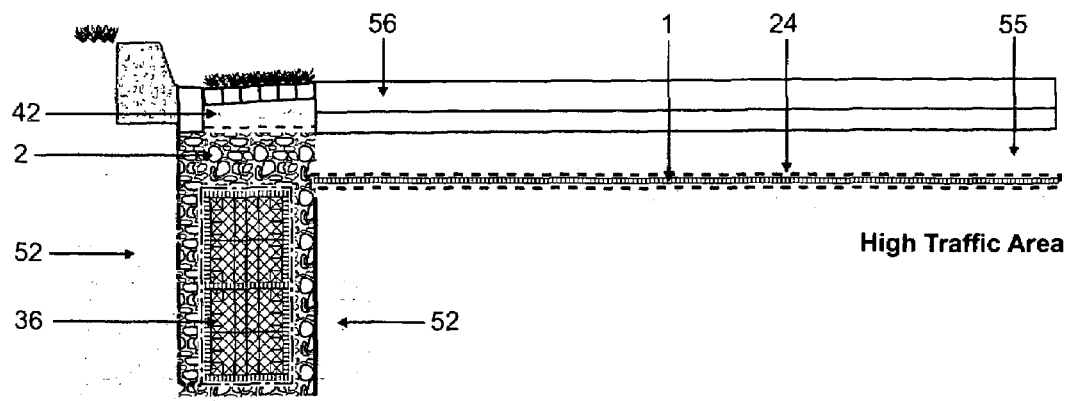
FIG. 14 illustrates a schematic cross-sectional view of a roadway drainage system, for high traffic areas, according to further embodiment of the present invention.

As shown in FIG. 14, in the case for high traffic areas, the water impervious road surface and sub surface is removed and layer of drainage cells (1) wrapped in geotextile (24) is laid in a water permeable substrata (55), and covered by water permeable bitumen or concrete (56). The drainage cells (1) allow water, that percolates through the water permeable bitumen or concrete (56), to flow along the channel of drainage cells (1) into the drainage modules (36), where the water is dispersed as described previously and also through the drainage cells (1) into the surrounding soil (52). The gutter infiltration area is similar to that described in the previous embodiments.

Figure 15:
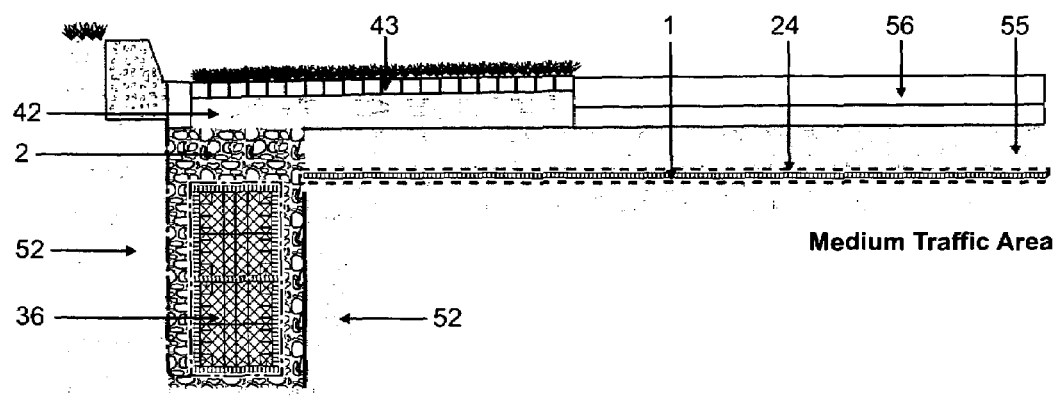
FIG. 15 illustrates a schematic cross-sectional view of a roadway drainage system, for medium traffic areas, according to further embodiment of the present invention.

In the case of a medium density traffic area, the infiltration area extends further out into roadway, and could be up to 2.5 meters wide, as shown in FIG. 15, to form the parking area for cars. The infiltration area is similar to that described in FIG. 14 except that the aggregate material (2) extends over part of the drainage cell (1).

Figure 16:
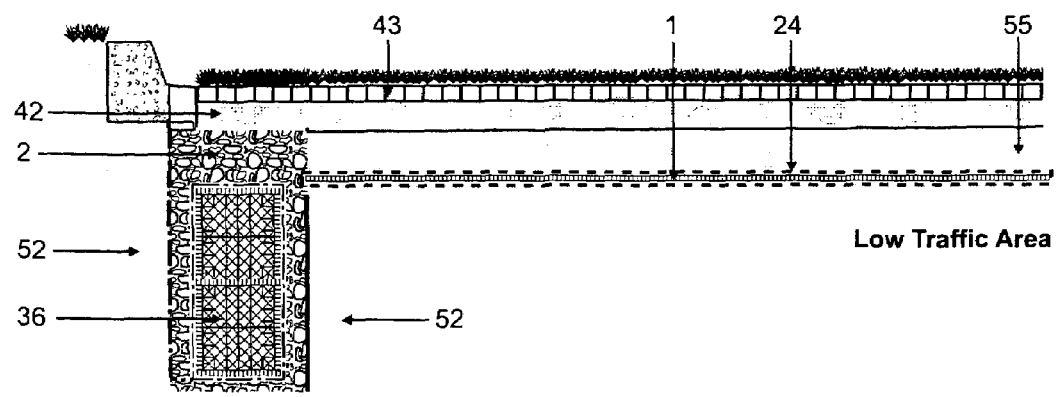
FIG. 16 illustrates a schematic cross-sectional view of a roadway drainage system, for low traffic areas, according to further embodiment of the present invention.

In low traffic areas the entire road could be made into an infiltration area, as shown in FIG. 16, wherein the geotextile wrapped drainage cells (1) and the overlaying aggregate material (2) extend right across the roadway and is covered by a filter soil (42) and covered by "grass cells" (20) or "grass blocks" (43), the runoff percolating through the entire road surface to be collected and returned to the soil similarly as described in the earlier embodiments.

The drainage cells could be of any construction, in which two substantially parallel perforated surfaces are rigidly held apart by spacer members and the like to form a hollow passageway therebetween. A suitable drainage cell is described in Australian Patent no. 593085.

Figure 17:
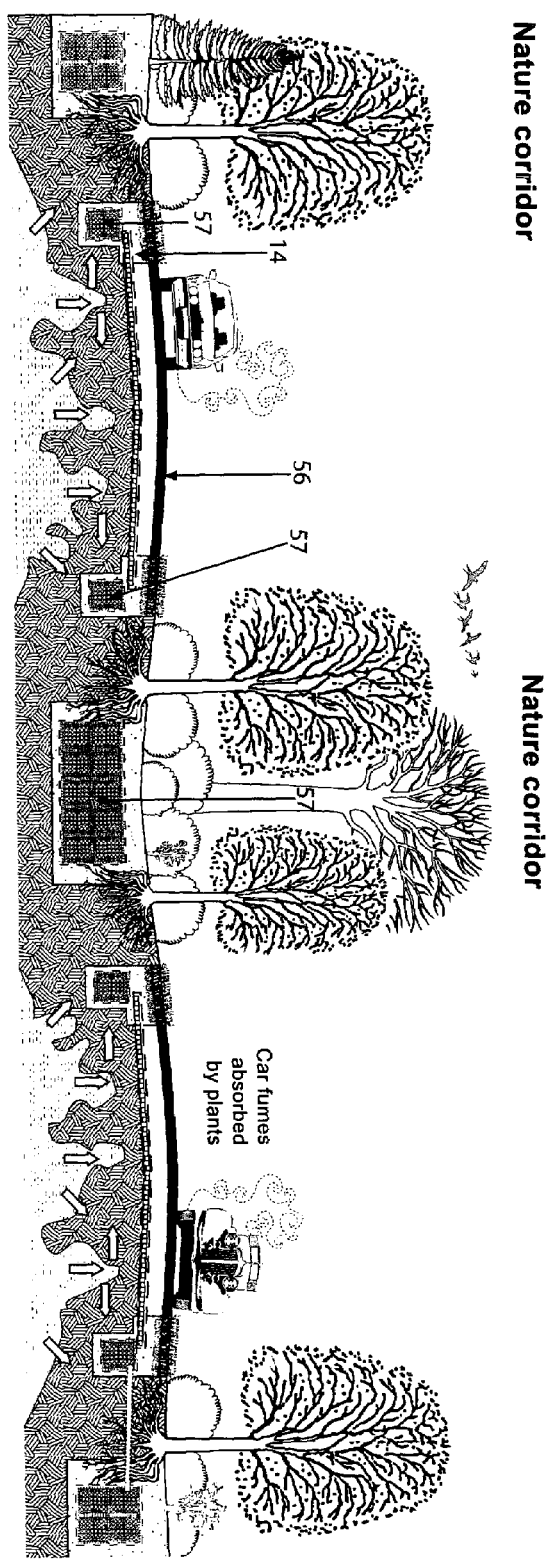
FIG. 17 illustrates, schematically, the application of the road drainage system according to an embodiment of the present invention as applied to a highway.

This technology can readily be applied to highway situations to assist in purifying water and the air, as shown in FIG. 17. A road construction and infiltration area (57) as shown in FIG. 14 could be used on each carriageway of a divided highway. Trees and other vegetation would border the road edges and have storage/percolation tanks (57) located near them, which could be fed from the drainage modules (38) or by other runoff. This would supply a slow release or percolation of water to the surrounding plants after the rain. Thus by the use of specific vegetation the system would help to remove air borne pollutants, while contaminated runoff water would be absorbed through the infiltration areas and collected and dispersed at its source, to reduce flooding and erosion, and to prevent contamination of the rivers and creeks.

Figure 18:
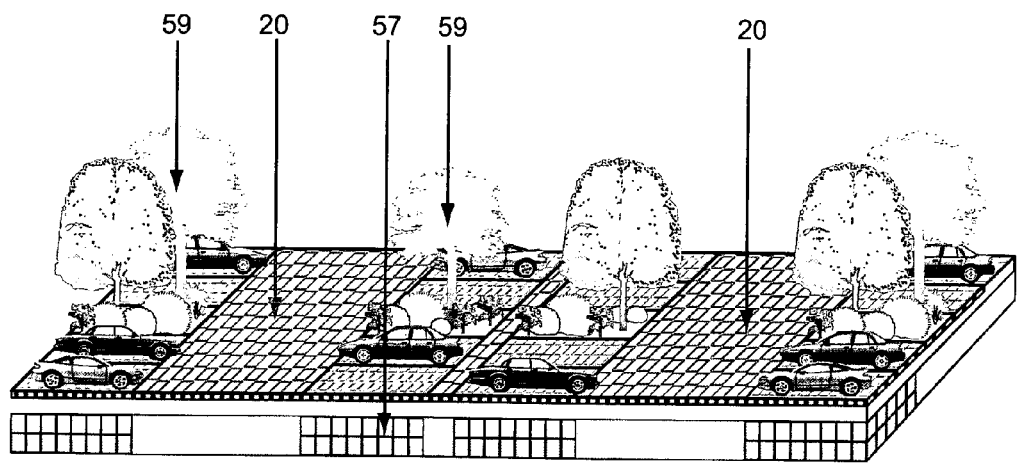
FIG. 18 illustrates the application of the road drainage system according to one embodiment of the present invention, as applied to a car park.

The above technology could also be applied to car parks, as shown in FIG. 18, wherein trees (59) are located in islands within the car park and surrounding the car park. The actual car park surface is constructed similarly to that the road surface of low traffic areas as shown in FIG. 16.

Figure 19:
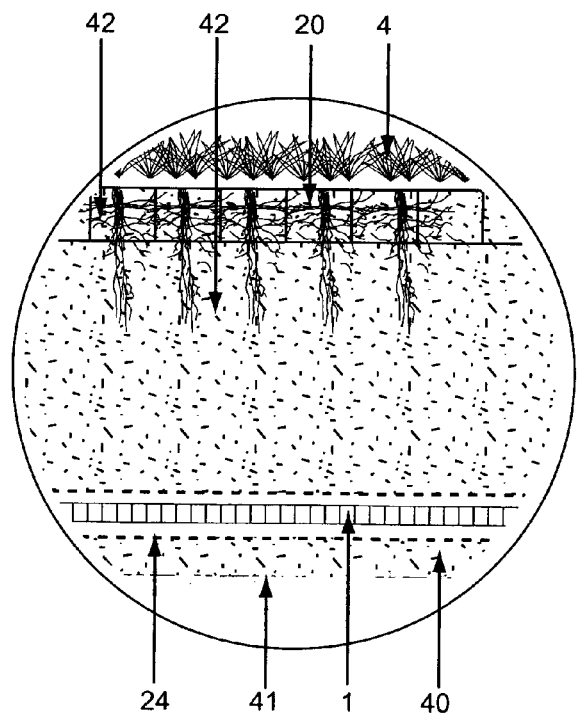
FIG. 19 illustrates the detail view of detail 1 from FIG. 18.

As shown in FIG. 19, the car park surface comprises drainage cells (1) wrapped in geotextiles (24) resting on a small layer of sand (50), which rests on the compacted earth (9). A layer of sand (50) and/or a layer of filter soil (42) of very good drainage characteristics covers the drainage cells (1). "Grass cells" (20) or "grass blocks" (43) filled with filter soil (42) and planted with grass (4) form the car park surface.

Figure 20:
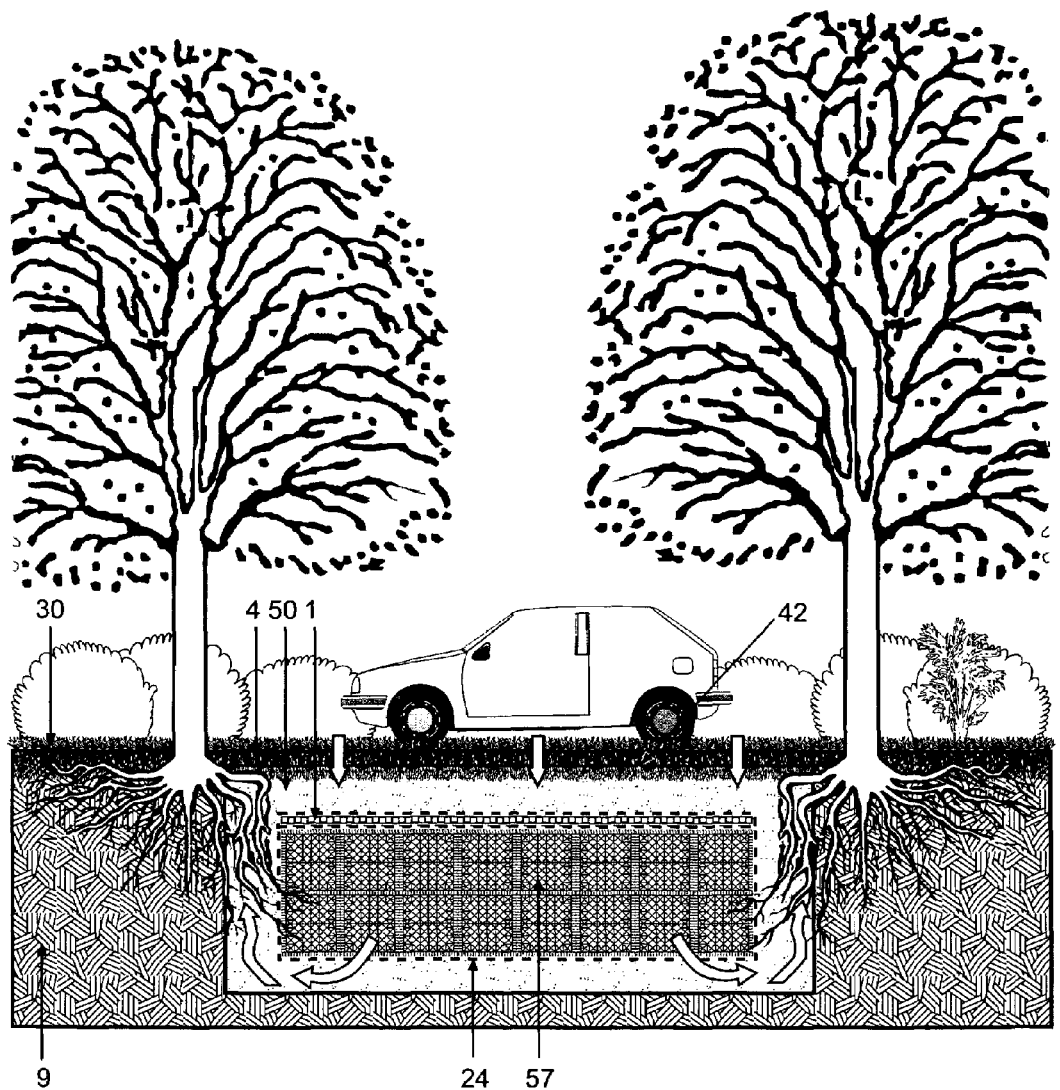
FIG. 20 illustrates the application of the road drainage system according to yet another embodiment of the present invention as applied to car parks.

Other areas of the car park are constructed as shown in FIG. 20, wherein the percolation tanks (57) are located underground, wrapped in geotextile (24) and buried in sand (50) or other material of good drainage and water retention properties, such a filter soil. If sand is used an upper layer of filter soil (41) should be used. "Grass cells" (20) or "grass blocks" (43) filled with filter soil (42) and planted with grass (4) form the car park surface.

Thus water percolates through the filter soil (42) where it is absorbed and the excess percolates into the percolation tanks (57). The percolation tanks (57) are located near the trees (59) to take up water that is collected in the percolation tanks (57).

The drainage cells (1) extend into other areas of the car park and are connected to feed excess water into the percolation tanks (57).

Figure 21:
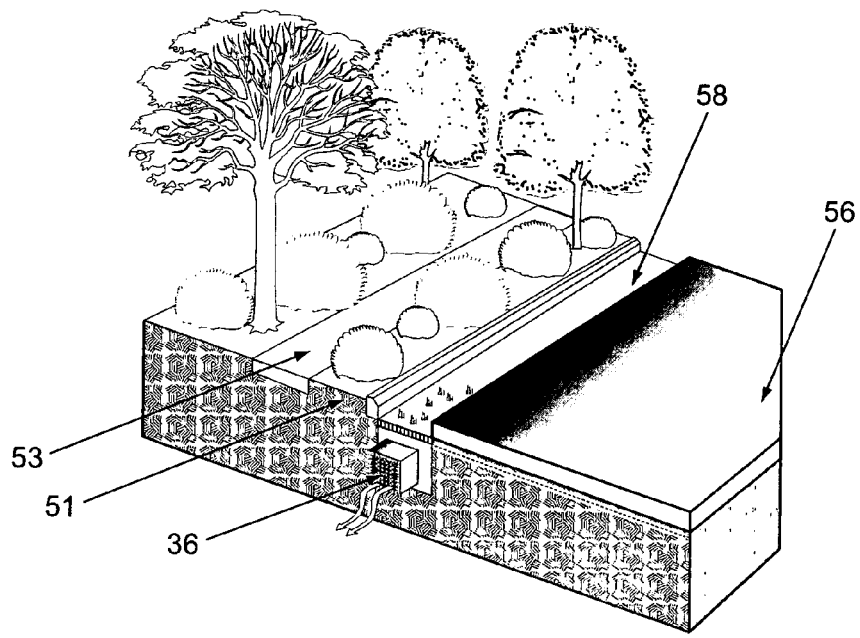
FIG. 21 illustrates a road drainage system according to an embodiment of the present invention as applied to a suburban street.

A variation of the embodiment shown in FIG. 14, is shown in FIG. 21, in which the infiltration area (58) and the footpath (63) are separated by a nature strip (61) planted with specific water retention vegetation, to assist in the taking up of water from the drainage modules (36) channels.

Figure 22:
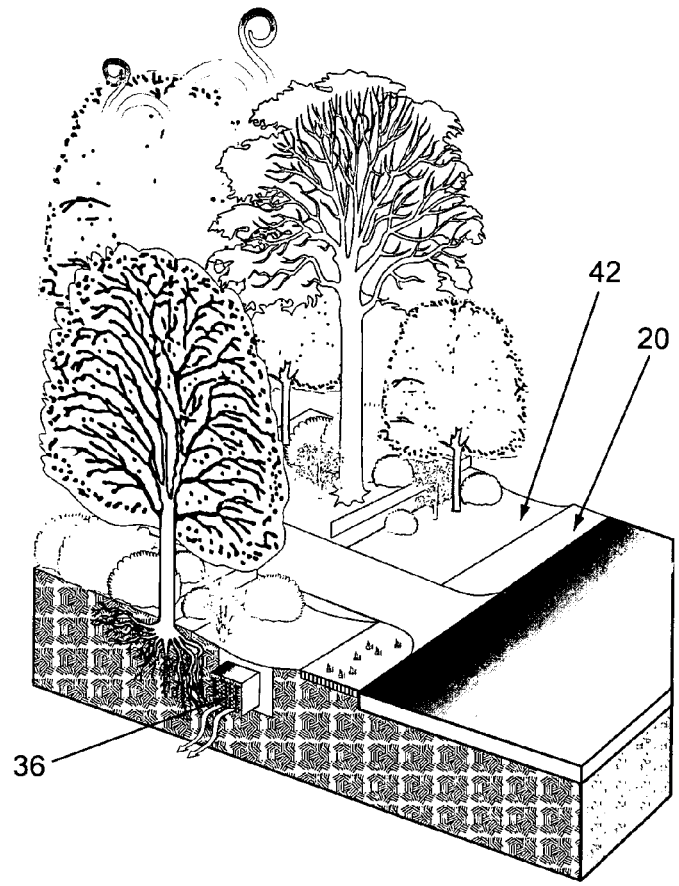
FIG. 22 illustrates a road drainage system according to another embodiment of the present invention showing a driveway access to a road.

An additional embodiment of the present invention is shown in FIG. 22, in which "grass cells" (20) or "grass blocks" (43) filled with filter soil (42) and planted with grass (4), form the road edge. The drainage modules (36) form a channel and are buried in filter soil covered in grass, to form a modified infiltration area (58) which has channel shaped upper surface and is lower than the road, such that runoff collects in the infiltration area, where it is absorbed in the filter soil, with the excess passing to the drainage module channels (36).

Figure 23:
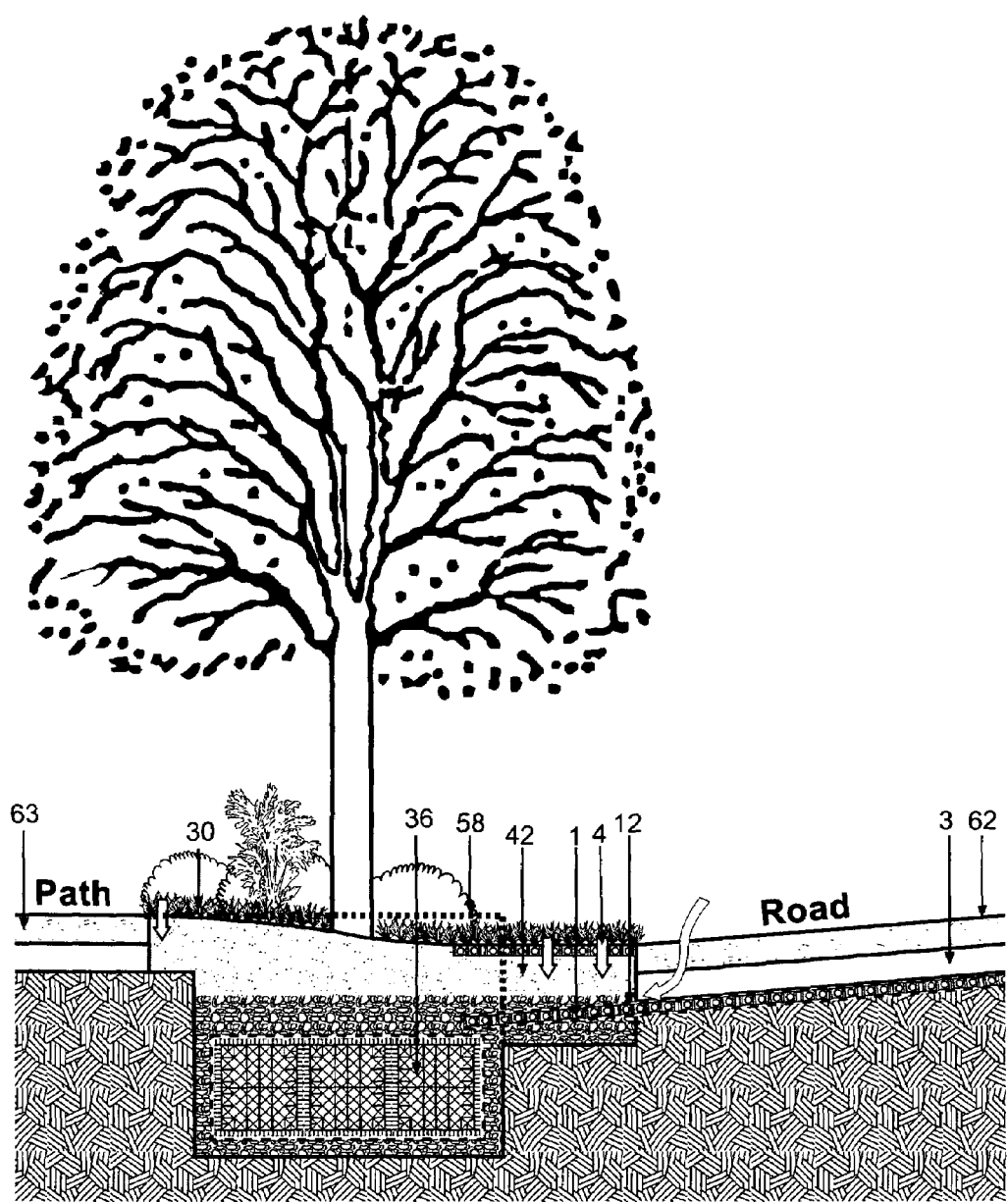
FIG. 23 illustrates a detailed sectional view if the drainage system shown in FIG. 22.

A detailed view is shown in FIG. 23 of a modification of the embodiment shown in FIG. 22. A water permeable road (62) slopes towards an infiltration area (58), which borders the footpath (63). Preferably the footpath (63) is made of water permeable material. Thus water can permeate through the road and pathway surfaces. The runoff flows into the infiltration area (58).

The infiltration area (58) comprises a filter soil (42) or EcoSoil (a trade mark of Atlantis Corporation Pty Ltd) shaped as a shallow ditch and covered in turf or grass (4) and with other assorted vegetation to take up water. The filter soil (42) or EcoSoil rests upon a layer of aggregate material (2). Located beneath the aggregate material (2) are drainage modules (36) wrapped in geotextile sheets (39). Drainage cells (1) extend beyond the drainage modules (36) in the infiltration area (58) to direct water into the drainage modules (36). Thus water is filtered as it passes through the filter soil (42) or EcoSoil, where water is retained for take up by the grass (4), while the excess percolates into the channels formed by the drainage modules (36), where the water flows there along, and is percolated back into the soil.

Figure 24:
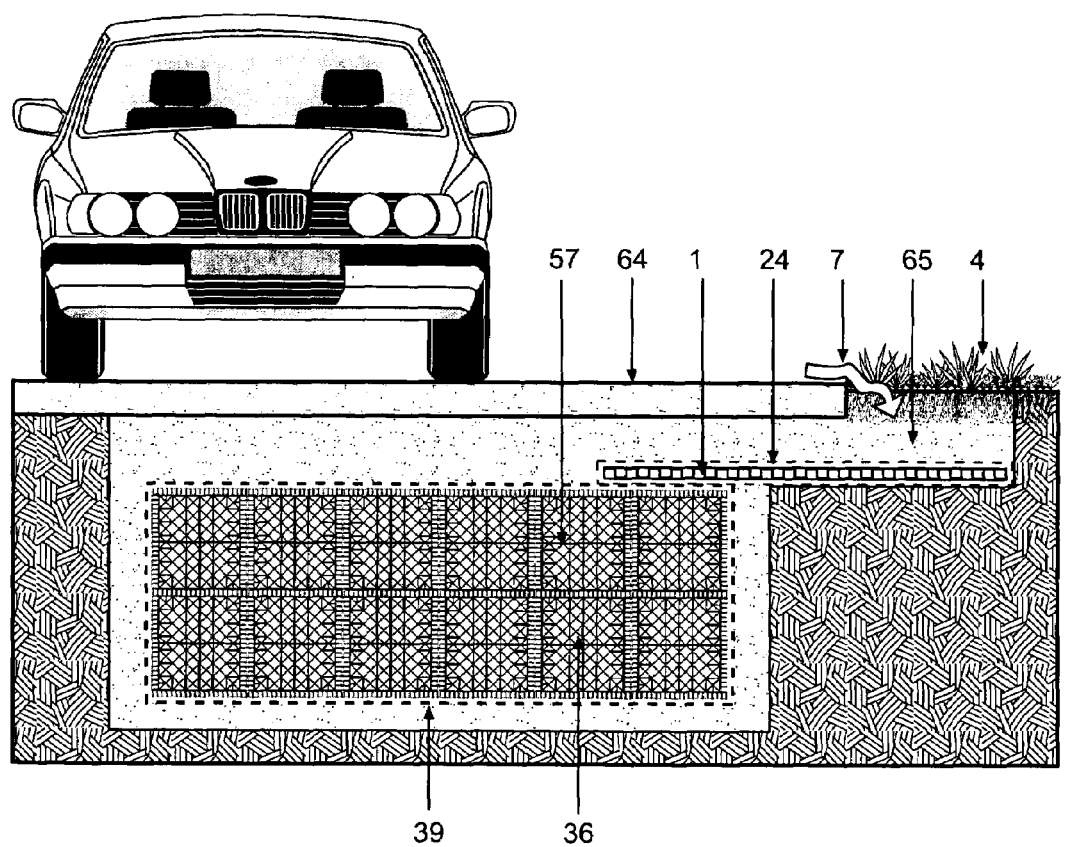
FIG. 24 illustrates a road drainage system according to an embodiment of the present invention, applied to a driveway.

This technology could also be used with areas that are covered by concrete or the like such as driveways or car ports, as shown in FIG. 24. In this embodiment, the concrete water impervious drive way (64) rests over a percolation tank (57) formed from a plurality of drainage modules (36) wrapped in a geotextile (39), and surrounded by a sand and soil mixture (65), having good drainage properties. The sand and soil mixture (65) extends beyond the concrete driveway (64) and is planted with grass (4), such that water, that runs off the driveway (64), percolates through the sand and soil mixture (65). To assist in the directing of water into the percolation tanks (57), a drainage cell (1), wrapped in geotextiles (24), connects the outside sand and soil mixture (65) to the percolation tanks (57), where the water is returned to the surrounding soil, as per the pervious embodiments.

Figure 25:
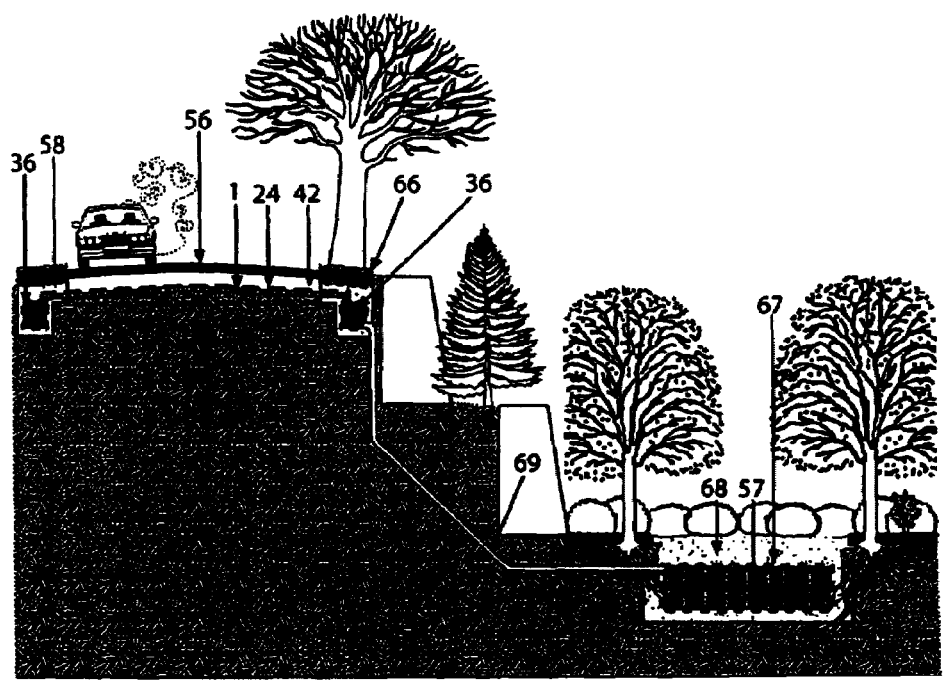
FIG. 25 illustrates the application of a road drainage system according to one embodiment of the present; applied to rural roads.

In the case of roads on hillsides, the technology can be applied as shown in FIG. 25, where the infiltration area (58), which can be constructed in accordance of any of the previous embodiments, is located on each side of the road. Preferably, the road surface (56) is made from water permeable bitumen or concrete. Drainage cells (1) wrapped in geotextile sheets (24) carries excess water collected in the high side infiltration area (58) underneath the road into the hillside drainage modules (36) of the low side infiltration area (66). Overflow from the channel formed from the drainage modules (36) in the low side infiltration area (66), flows down an underground pipe (69) to a percolation tank (57) in the valley, that is located in a trench (67) and is covered by river sand (68) or material of similar good drainage properties. Run off running down the valley soaks through the river sand (68) and into the percolation tanks (57).

Figure 26:
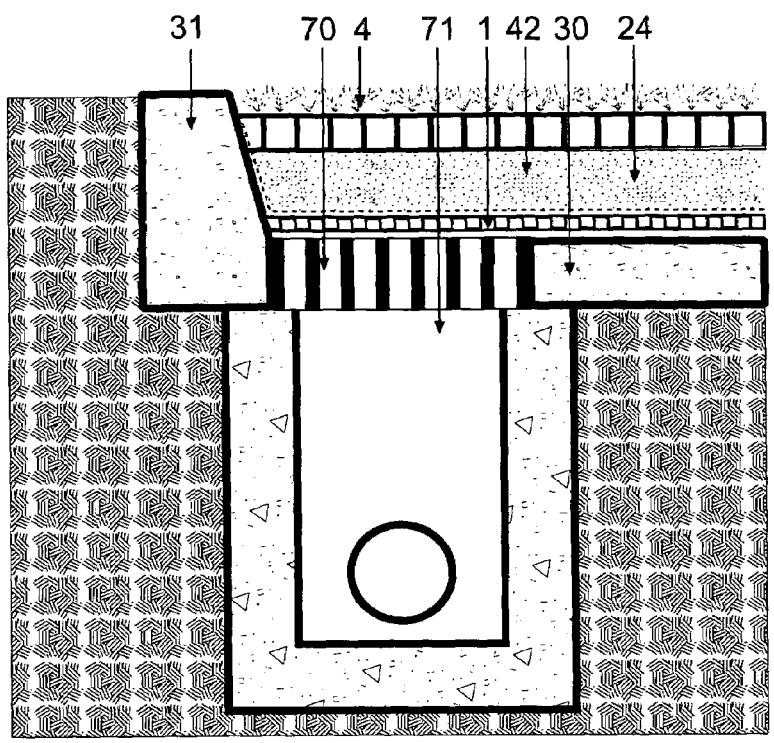
FIG. 26 illustrates a schematic cross-sectional view of the modification of an existing road drainage system to form a road drainage system according to an embodiment of the present invention.

In another embodiment existing water impervious streets can be modified as shown in FIG. 26, wherein the water impervious road way (30), the gutters (31) and the drain grating or sump (70) are covered by drainage cells (1). A lining of geotextile (24) covers the drainage cells (1) and is sealed against the kerb (31). A suitable layer of EcoSoil or filter soil (42) covers the geotextile (24). "Grass cells" (20) or "grass blocks" (43) filled with filter soil (42) and planted with grass (4) cover the layer of EcoSoil or filter soil (4), to form an infiltration area. Thus rain and run off percolates through the infiltration area and then flows into the existing old drain system (71).

Whilst this system still returns water to the river systems, the water has been purified, by passing through the grass (4) and the EcoSoil or filter soil (42), to remove all solid pollutants and to absorb other pollutants in the grass and soil where they are broken down by biological action.

Figure 27:
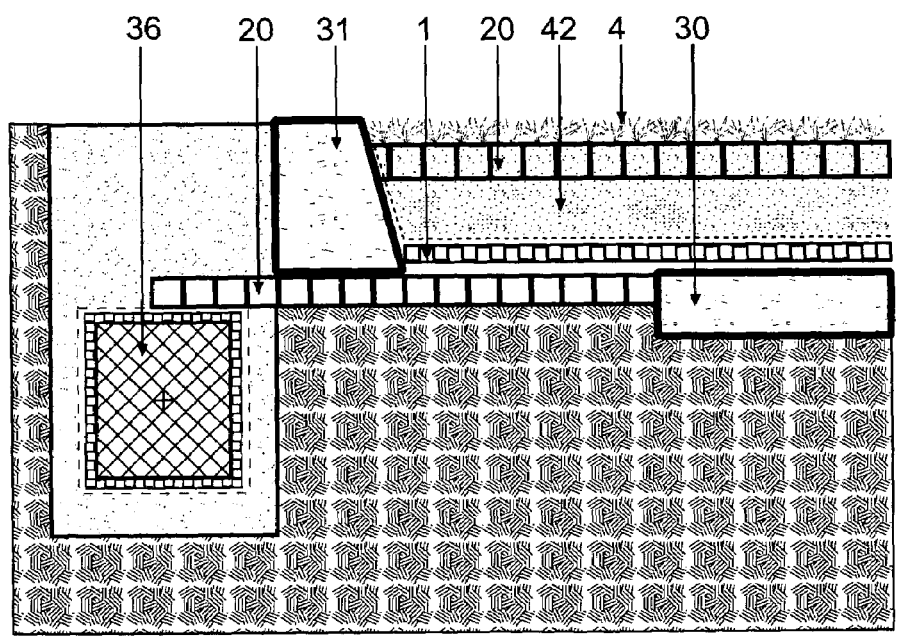
FIG. 27 illustrates a schematic cross-sectional view of the modification of an existing road drainage system to form a road drainage system according to another embodiment of the present invention.

FIG. 27 illustrates a modification of the previous embodiment where the water impervious road surface (30) is covered by a similar infiltration area, but rather than use the existing drainage system, drainage cells (1) or "grass cells" (20) or "grass blocks" (43), connect the underneath of the edge of the infiltration area to a percolation tank (57).

Thus the present invention uses vegetation and soil to, both, filter out pollutants and to absorb runoff, and to hold the water underground for slow release back into the soil to stimulate plant growth. Thus erosion and the pollution of the waterways are reduced.

It should be obvious to people skilled in the art that modifications and alterations can be made to the above embodiments without departing from the scope and the spirit of the present invention.

The invention claimed is:

1. A roadway or other transport corridor drainage system comprising:
  at least the edge surface of the roadway or other transport corridor being formed by a drainage structure which is generally flat in nature and is for use mainly in a horizontal or substantially horizontal disposition, and comprises top and bottom plate members which are held spaced apart by spacer members so that the structure is cellular in nature with the cells hydraulically interconnected with each other, the plate members having apertures therein which are disposed so that the apertures in the top plate member are offset relative to the apertures in the bottom plate member, and wherein there are web walls extending between adjacent spacer members at the lower plate member and form at their top edges, weirs for water which is retained by the web walls, wherein the top edges of the web walls are curved, notched or otherwise shaped or the walls have apertures, to cause the water spilling over these edges into adjacent cells at a varying velocity profile to increase the oxygenation of the water as it splashes on falling from the weir top edges; the voids within the drainage structure being filled with aggregate material, being permeable to water, such that water can flow therethrough;
  a water permeable drain located at least below said drainage structure; and
  a water permeable retention tank connected to said permeable drain, such that runoff passes through the permeable surface of the draining structure into the permeable drain and into the permeable retention tank, where the water is stored and flows back into the soil through the walls of the tank.

2. A roadway or other transport corridor drainage system according to claim 1, wherein the web walls are provided adjacent the top and bottom plates, so that the structure is usable equally well either way up, i.e., with either plate upmost.

3. A roadway or other transport corridor drainage system according to claim 1, wherein the support surfaces have openings therethrough.

4. A roadway or other transport corridor drainage system according to claim 1, wherein the water permeable drain comprises two planar perforated surface separated by spacer members and wrapped in water permeable geotextiles.

5. A roadway or other transport corridor drainage system according to claim 1, wherein the water permeable drain comprises box like modules having perforated surfaces, and covered in water permeable geotextiles.

6. A roadway or other transport corridor drainage system according to claim 1, wherein the aggregate material is a growing medium, with grass growing therein, with the roots of the grass free to extend downwardly through the drainage structure into the strata below and to extend transversely through the drainage structure.

7. A roadway or other transport corridor drainage system comprising:
   at least the edge surface of the roadway or other transport corridor being formed by a drainage structure having two perforated planar members held apart, by substantially rigid spacer members; the voids within the drainage structure being filled with aggregate growing medium, being permeable to water, such that water can flow therethrough, said aggregate growing medium having grass growing therein, with the roots of the grass free to extend downwardly through the drainage structure into the strata below and to extend transversely through the drainage structure;
   a water permeable drain located at least below said permeable edge surface; and
   water permeable retention tank connected to said permeable drain, such that runoff passes through the permeable surface into the permeable drain and into the permeable retention tank, where the water is stored and flows back into the soil through the walls of the tank.

8. A roadway or other transport corridor drainage system according to claim 7, wherein the water permeable drain comprises box like modules having perforated surfaces, and covered in water permeable geotextiles.

* * * * *